United States Patent [19]

Heitmann

[11] 4,066,864
[45] Jan. 3, 1978

[54] METHOD AND APPARATUS FOR PRODUCING FEEDERS FOR SUPPLY OF HEAT SOFTENABLE MATERIALS

[75] Inventor: Arthur C. Heitmann, Newark, Ohio

[73] Assignee: Owens-Corning Fiberglas Corporation, Toledo, Ohio

[21] Appl. No.: 582,058

[22] Filed: May 29, 1975

Related U.S. Application Data

[63] Continuation-in-part of Ser. No. 377,854, July 9, 1973, abandoned.

[51] Int. Cl.² .................................................. B23K 9/00
[52] U.S. Cl. ............................................. 219/121 EM
[58] Field of Search ............... 219/121 EB, 121 EM, 219/121 L, 121 LM, 125 TP, 125 R, 107, 93, 99; 29/157.3 C

[56] References Cited

U.S. PATENT DOCUMENTS

| | | | |
|---|---|---|---|
| 2,922,870 | 1/1960 | Collins et al. | 219/125 R |
| 2,933,590 | 4/1960 | Leedy et al. | 219/107 |
| 3,033,974 | 5/1962 | Schleich et al. | 219/121 EM |
| 3,592,996 | 7/1971 | Sayer | 219/121 EM |
| 3,783,230 | 1/1974 | Peyrot | 219/121 EB |
| 3,806,693 | 4/1974 | Miller | 219/121 EB |

OTHER PUBLICATIONS

Metals Handbook, vol. 6, 8th Edition, 1971, pp. 534–536.

Primary Examiner—Bruce A. Reynolds
Assistant Examiner—Fred E. Bell
Attorney, Agent, or Firm—John W. Overman; Ronald C. Hudgens

[57] ABSTRACT

The disclosure embraces method and apparatus for producing stream feeders for supply of streams of heat-softenable fiber forming material such as glass for attenuation into fibers. The invention sets forth an improved method for securing preformed, flanged tubular members to an orificed plate by utilization of an electron beam welding device.

12 Claims, 7 Drawing Figures

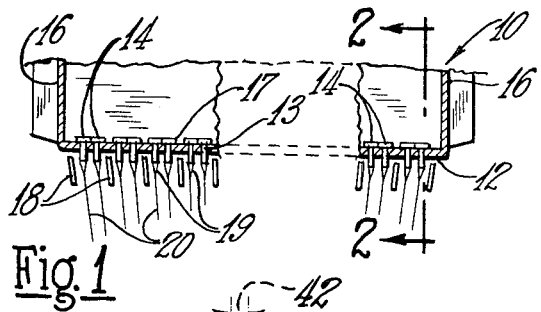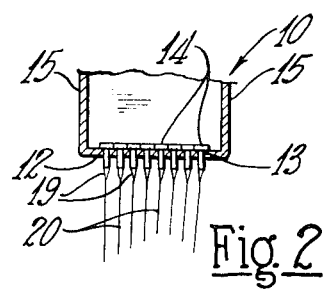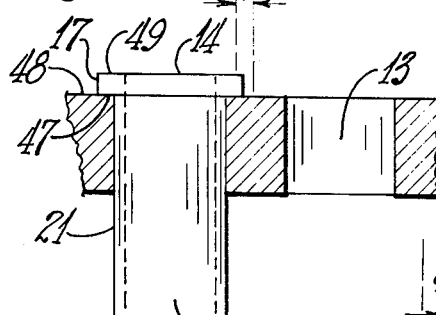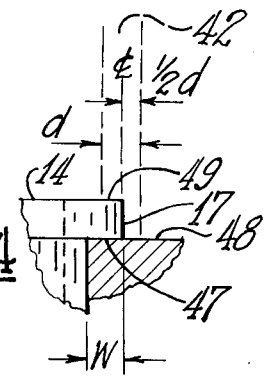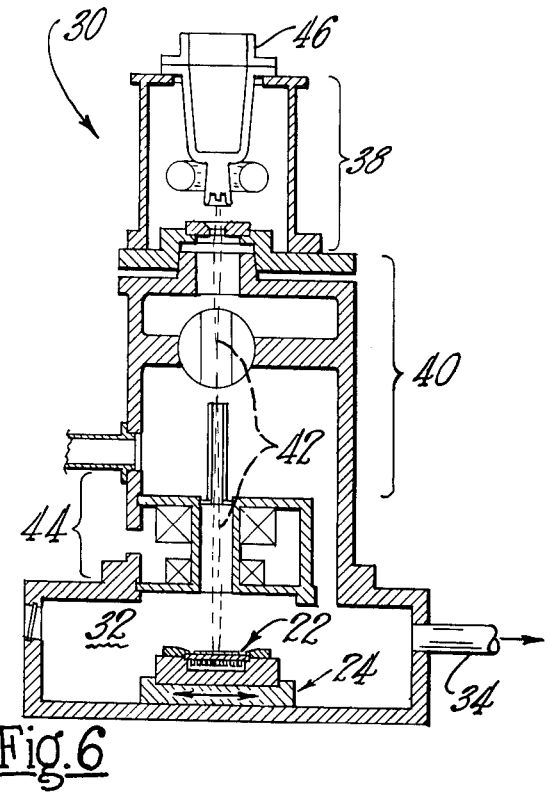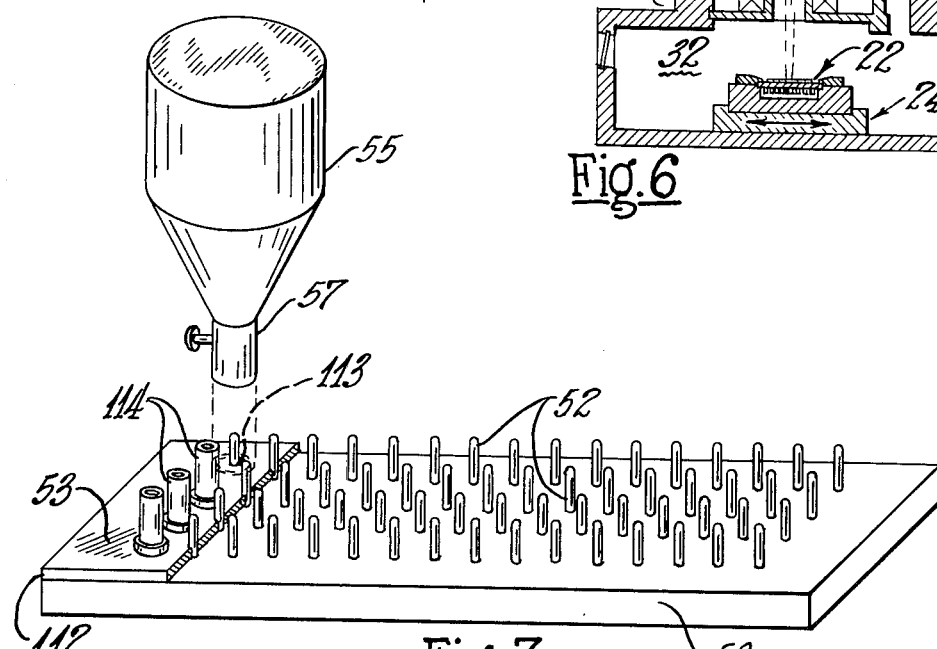

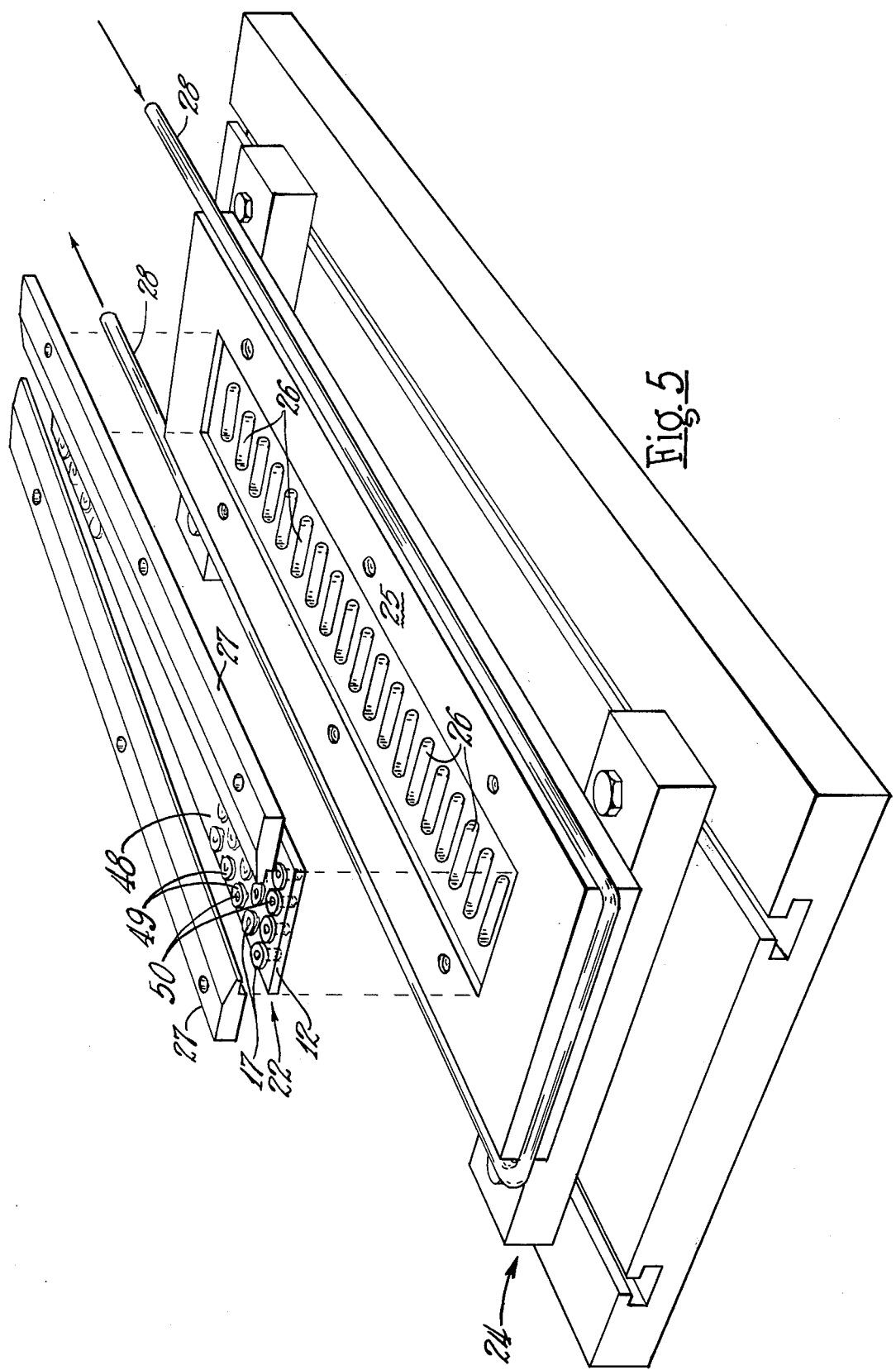

4,066,864

METHOD AND APPARATUS FOR PRODUCING FEEDERS FOR SUPPLY OF HEAT SOFTENABLE MATERIALS

BACKGROUND OF THE INVENTION

This invention relates to method and apparatus for making stream feeders or bushings for flowing streams of heat-softened mineral material, such as glass, and more especially to a method and apparatus for producing a stream flow section or tip section of a feeder or bushing.

In the art of processing heat-softenable mineral material, such as glass into fibers or filaments and particularly continuous filaments used in the manufacture of textiles, it is standard practice to employ a receptacle, feeder or bushing having a bottom wall or floor provided with a plurality of orifices. Streams of heat-softened material flow through the orifices and are attenuated into fibers or filaments. It has been a practice to fashion the bottom wall or floor of the feeder of a platinum and rhodium alloy with projections through which the orifices are formed. The small orificed projections or tips help to prevent flooding of the molten glass across the bottom wall of the feeder. Also the projections aid the cooling of the minute glass streams emitted therefrom for attenuation into fibers.

Development in the art of forming textile fibers or filaments or glass is toward the production of textile strands of extremely fine filaments wherein thousands of filaments comprising one strand are drawn from streams of heat-softened glass from a single feeder. It therefore becomes imperative to fashion the orificed projections in close relation with proper spacing of the tips or projections. Also it is important that the projections be of uniform size and bore or passageway size to promote a uniform glass stream size so that fine filaments or fibers attenuated from the streams are of uniform character.

Endeavors have been made to fabricate or manufacture a feeder or bushing tip section by drilling holes in a plate, inserting flanged eyelet-like members in the openings and electric resistance welding the flanges on the eyelets to the floor or bottom plate to form a tip section. The preformed eyelets provide a convenient way to make the necessary projections or tips. A method of this character is disclosed in the Leedy and Russell U.S. Pat. No. 2,933,590. In this method the entire flange of an eyelet member is fused during electric resistance welding. However, because the electrode is in direct contact with the fused metal of the eyelet member, there is a tendency for the eyelet member to become contaminated with the metal of the electrode. Also, the heat generated may tend to warp or distort the preformed eyelet or tip and thereby change the size of the eyelet passageway.

The Roberson U.S. Pat. No. 3,598,952 discloses a method designed to improve upon the electric resistance welding method by avoiding contamination of the plate by the electrode material and minimizing the amount of electric current needed to effect the weld. In this method, the fabrication is modified to improve the electric resistance welding of the projections to the plate by providing a non-orificed projection to the projection has greater structural strength and is less apt to distort when heated. Also the flange on each projection has a small linear ridge which provides a reduced area contacting the plate. This small ridge offers greater control over the welding operation because the current flow is concentrated in the ridge and because there is greater assurance of complete contact of the flange with the plate. Once the projections are welded to the plate, the holes are drilled through the plate and the projections at the same time to form a continuous passage.

Although the Roberson patented process offers distinct welding advantages over the Leedy and Russell process, it has its own particular limitations. The drilling of the combined plate and projection must be done with extreme care to assure the hole is concentric with the outside of the projection. Considering that the outside diameter of the projection may be smaller than 0.100 inches and the hole diameter 0.075 inches, there is not much room for error. The process is also limited in that the electric resistance welding of the small ridge to the plate cannot be visually inspected. The weld interface is hidden from view. Also electric resistance welding, because of its character, causes some splattering of the molten metal forming tiny beads that adhere to the plate. Because of the high value of the platinum alloy, care must be taken to recover these tiny beads.

The use of preformed eyelets in feeder fabrication is preferred because it has the advantages of uniformity and easier construction. However, it has peculiar shortcomings as outlined in the Roberson patent. Therefore, if a method for attaching such tiny orificed projections to an orificed plate could be developed which would not distort the size and dimension of the eyelets and its passageway or bore, which could be easily visually inspected, and which could give satisfactory performance during the operating life of the feeder, a substantial contribution would be made to advance the art of glass fiber forming.

SUMMARY OF THE INVENTION

Accordingly, it is a principle object of the present invention to provide improved method and apparatus for attaching orificed projections to a stream feeder.

An object of the present invention is to produce glass stream feeders having orificed projections in the form of flanged tubular members or eyelets inserted in holes of a metal plate and fused by means of an electron beam to the plate to provide a continuous weld around the periphery of the flanges that can be visually inspected.

A further object of the invention is to provide method and apparatus for electron beam fusing tiny, preformed eyelets to an orificed plate without distorting, contaminating or otherwise adversely affecting the tiny eyelets.

In a broad sense the present invention accomplishes the above objectives by fusing with a concentrated electron beam the flanges of orificed projections to a metal plate that will serve as the feeder bottom wall. In a preferred embodiment tubular, flanged eyelets are inserted into holes in a plate of precious metal, normally platinum, rhodium or other high temperature resistant material. The eyelets are moved into the apertures so that its flanges are in solid contact against the plate. The complete assembly of eyelets and plate is enclosed in the vacuum chamber of an electron beam welder. The welder has a electron beam path generator so it is able to direct a small beam of electrons at the circular flange. As the power is brought up to its maximum, the beam is moved around the eyelet to fuse the flange to the plate.

In a more specific sense the present invention accomplishes the above objectives by directing an electron beam of such a size as to overlap the outer peripheral edge region of the flanges of tubular members and the immediately adjacent surface of a plate to form around the entire outer periphery of the flange a continuous weld between the flange and plate. In a preferred embodiment, individual tubular eyelets each having a circular flange are inserted into apertures in a precious metal plate; each of the eyelet flanges is moved to bring its flange into contact with the plate. A complete assembly of eyelets and plate is placed in the vacuum chamber of an electron beam welded that has a circle generator effective to move an electron beam around the circumference of the flanges. The electron beam is directed to simultaneously engage both the outer circumferential edge region of individual eyelets and the surface of the plate in the immediate vicinity to form around the entire circumference of each flange a continuous fusion weld between the flange and the plate.

Since the electron beam fuses the outer peripheral edge region or portion of the flange to the plate, the welded portion may be visually inspected to assure that a continuous weld has been made around the entire periphery of the eyelet's flange.

The advantage of using the electron beam welding method of the invention includes better control of the welding operation. The welding apparatus does not have to contact the eyelets or plate; thus there is no metal or other contamination of the feeder as when electric resistance welders are used. Also, the heating electron beam is narrow and can be directed according to the invention so that there is a minimum of adverse thermal effect on the adjacent areas of the plate and of the eyelet itself. A stream flow section can be produced with substantially no dimensional changes to the eyelet passageways or bores from fusing.

Other advantages and features of this invention will appear in the following description and appended claims, references being had to the accompanying drawings wherein like reference characters designate corresponding parts in the several views.

DESCRIPTION OF THE DRAWINGS

FIG. 1 is a longitudinal sectional view through a bushing or feeder of the invention utilized for flowing streams of molten mineral material illustrating the arrangement of orificed members or tips in the floor of the feeder or bushings.

FIG. 2 is a vertical transverse sectional view through the feeder taken substantially on the line 2—2 of FIG. 1.

FIG. 3 is an enlarged fragmentary sectional view showing an orifice tip or eyelet in position to be welded to a feeder plate. The dashed lines indicate the electron beam.

FIG. 4 is an enlarged view of a portion of the plate and eyelet showing of FIG. 3.

FIG. 5 is an exploded isometric view of a feeder plate and supporting fixture.

FIG. 6 is a sectional view through an electron beam welding apparatus illustrating the arrangement of the feeder plate within the vacuum chamber.

FIG. 7 is an isometric view of another embodiment of the invention wherein the preformed eyelets are attached to the bottom of the plate.

Referring to the drawings in detail, and initially to FIGS. 1 and 2, there is illustrated a feeder or bushing 10 embodying the invention which is particularly adapted to contain heat-softened or molten mineral material such as glass. The lower wall or floor 12 is provided with means for flowing streams of the mineral material which may be processed or attenuated to filaments or fibers by conventional attenuating means. The floor or plate 12 of the feeder is provided with a plurality of openings 13 which accommodate small flanged orifice members, tips or eyelets 14 which are welded to the plate 12 through the utilization of the method of the invention.

The feeder walls 15 and 16, the bottom wall or plate 12, and the orificed projections 14 are formed of materials capable of withstanding the intense heat of molten glass. And such materials include precious metals such as platinum or platinum alloyed with rhodium or iridium. The side walls 15 and the end walls 16 and the floor 12 are typically fashioned as individual plates which are welded together by conventional fusion techniques.

Feeders of the character shown are used particularly for flowing a large number of streams of glass which are attenuated into fine filaments and subsequently processed or twisted into textile yarns or threads for textile uses. It is highly desirable to concomitantly form a substantial number of individual filaments from streams discharged from the feeder for forming textile threads, yarns, or strands. Hence, the floor 12 is provided with as many closely bunched orifice tips or members as can be successfully incorporated therein and the number of orifices may be two-thousand or more in a single feeder.

It should be noted in FIG. 1 that the orificed projections 14 are arranged in pairs of rows, the pairs being spaced to accommodate cooling plates or fins 18 disposed respectively between each two transverse rows of projections 14. The fins 18 absorb heat from the glass streams 19 to stabilize the streams and render them of uniform temperature and viscosity in order to provide substantially uniform filaments or linear bodies 20.

The projections or eyelets 14 may be produced by conventional methods from small sections of tubing, or by the methods like those described in the Matulewicz U.S. Pat, No. 3,579,807. However, it has been found that conventional eyeleting machines are able to deep draw eyelets from strip stock at a production rate of over one hundred eyelets per minute. This latter method of eyelet production has proved most satisfactory.

The circular openings or holes 13 in plate 12 may be punched, drilled or otherwise formed. Whatever hole forming method is used, it must be one which will accurately form the tiny holes of the desired size and in an exact location without deforming or otherwise damaging the plate 12.

For satisfactory assembly of the eyelets or tips 13 on the plate 12 the eyelets can be inserted into the holes 13. Care must be taken to assure that there is a snug intimate contact between the touching surfaces of the eyelet flange 17 and the plate 12. Also, it is important not to exert too much pressure as it may deform the eyelets or projections 14 or the flange portion 17. Since the holes 13 are so closely spaced, it is also imperative that the plate 12 be suitably supported during insertion of the eyelets or projections 14.

As illustrated in FIGS. 5 and 6 after all the eyelets or projections 14 have been inserted into the openings 13, the assembly 22 of plate and eyelets is mounted in the fixture 24 for welding in the vacuum chamber 32 of the electron beam welder 30. The fixture 24 comprises a recessed bottom plate 24 having longitudinal openings 26 formed therein to accommodate the rows of projecting eyelets or tips 14. FIG. 5 illustrates a portion of the clamping means 27 provided to securely hold the assembly 22 in the fixture 24. Connected adjacent the periphery of the fixture is a water-cooled tube 28. Although the electron beam fusing of the individual eyelets to the plate products only a small amount of heat, because of the great number of eyelets to be welded, the plate may heat up. The water-cooled tube 28 receives cool water from a source (not shown) thus cooling the fixture 24 and the assembly 22 and helping to control the plate dimensions.

The electron beam welder 30 shown schematically in FIG. 6 is one of the types commercially available. The electron beam welder generates a stream of electrons traveling at about one-half the speed of light. The welder focuses the beam to a small, precisely controlled spot at the periphery of the eyelet flanges 17 in a vacuum. And the kinetic energy of the electrons is converted into high temperature on impact with the eyelet flange 17 and plate 12. Such commercial electron beam welders typically comprise, as shown in FIG. 6, a work or vacuum chamber 32, a connection 34 to a vacuum pumping system (not shown), an electron gun 38, beam column 40, a connection 46 to a high voltage source not shown, a beam deflection system 44 and a control cabinet (not shown).

The electron gun 38 contains a heated tungsten filament which emits electrons. The electrons are concentrated to small diameter beam by an electron optics system surrounding the beam column 40. An electronic deflection system is also typically provided to direct the electron beam 42 in the desired manner. For the purposes of the disclosed embodiment of this invention the deflection system comprises a circle generator for moving the electron beam 42 along a circular path.

To perform the welding operation, the assembly 22 is placed in the fixture or work table 24 within the vacuum chamber 32. The welder positions the electron beam gun axially over the first eyelet to be welded. This positioning may be done by conventional commercially available numerical control means, which may include means for adjusting the position of the work table and fixture 24 or means for moving the electron beam gun assembly 38. Information is fed by conventional means to the electron beam welder concerning the size and position of the eyelets. Air is evacuated from the vacuum chamber.

The electron beam welder directs towards the first eyelet an electron beam of sufficient size to engage simultaneously both the outer circumferential region of the eyelet's flange 17 and the plate 12. The circle generating system of the welder deflects the electron beam to move around the entire periphery of the flange to form a continuous fusion weld at the periphery of the flange. The welder then positions the electron beam 42 over the next eyelet to be welded; the welding sequence is repeated. The welding and indexing cycle continues, eyelet by eyelet, without breaking vacuum and set-up until all the eyelets have been welded to the plate.

Tests have shown that over 20 eyelets per minute can be welded in this manner.

FIGS. 3 and 4 are enlarged showings of an eyelet 14 that has been inserted into a hole 13 for electron beam welding to the plate 12. As can be clearly seen in these figures the flat laterally extending flange surface 47 of the eyelet 14 is in intimate contact with the flat major surface 48 of the plate 12 when the eyelet 14 is fully inserted into the aperture 13. And the opposing flat laterally extending flange surface 49 is facing away from the plate 12.

At times it may be advantageous for purposes of improved welding to press or coin the eyelet 14 and plate together to bring the flange surface 47 into close intimate contact relation with the major surface 48 of the plate 12.

In FIGS. 3 and 4 the dashed lines 42 indicate a preferred path for the electron beam 14: a path that causes the beam 42 to overlap the outer circumferential region of the flange 17 and the plate 12 so that the center-line of the beam 14 is at the outer edge of the flange 17. Therefore in FIGS. 3 and 4 the beam 42 overlaps the flange 17 and plate 12 so that one-half of the beam width ($\frac{1}{2}$ $d$) strikes the flange 17 and the other one-half of the beam width ($\frac{1}{2}$ $d$) strikes the major surface 48 of the plate 12 immediately adjacent the outer edge of the flange 17. Also, as indicated in FIG. 3, the beam 42 has a width or thickness d that is the same dimension as the width w of the flange 17 beyond the diameter of the shank 21. So as shown the electron beam 42 does not strike the flange 17 any closer to the flange's minor diameter or inner circumferential edge (at the shank 21) than mid-location ($\frac{1}{2}$ $w$) of the flange 17.

In the embodiment shown the beam deflector of the welder 30 moves the beam 42 (keeping its overlapping relation with the plate 12 and flange 17) along a circular path around the entire circumference of the flange 17 so as to form a continuous weld around the entire circumference of the flange 17 between the plate 12 and the flange 17.

The welding must be done carefully so that the continuous peripheral flange welds are made without distorting the dimensions of the eyelet passageways (denoted by reference numeral 50 in FIG. 3). This requires a high degree of precision since the eyelets are very small. In this regard it is imperative to keep the beam 42 away from the minor diameter of the flanges 17. In practice, it has been advantageous to keep the beam 42 at the mid-region of the flange 17 as indicated in FIGS. 3 and 4 or outwardly thereof. Also, process variables such as the energy or power of the electron beam, speed of beam movement, and beam width are important; they must be selected to effect the continuous outer edge flange weld, but yet keep the dimensions of the eyelet passageway 50 stable or unchanged from the thermal effects of welding. This normally means no fusion is effected between an eyelet and plate at the inner peripheral edge of a flange.

It has been found that to avoid the forming of pits when starting or stopping the beam, the power to the beam should be increased gradually and the beam moved around the flange as the power is increased. In one operation, it was found good weld results obtained when the beam is moved one-half way around the eyelet (flange 17) as the power is increased to the desired level. Once at the desired power level, the beam continues to be directed around the eyelet for one full turn. Finally, as the power is reduced, the beam is directed one-half way around the eyelet to its original starting place. Such a procedure helps assure a uniform weld. And the whole cycle takes only about three seconds.

The electron beam welding system is uniquely beneficial to the welding of the tiny eyelets to the plate. The system can operate on less than three kilowatts of power and does not generate as much heat in the plate as prior direct resistance welding techniques. Except for the fixture 24, no metals which could cause contamination of the platinum come in contact with the eyelets or plate during the welding. Nothing is in contact with the metal adjacent the hot weld joint.

And as indicated the electron beam also provides a focused very narrow energy beam, which, for example, can be as small as 0.015 inches. This small precisely controlled beam is especially important considering the small size of the eyelets. As an example, the following are typical dimensional characteristics of the thickness of the bottom plate 12 of the feeder and form of eyelet welded to the plate, both the plate and the eyelets being formed of noble metal or alloys thereof such as platinum or a composition of platinum and rhodium or platinum and iridium.

The bushing floor 12 may be approximately forty to sixty thousandths of an inch in thickness. The tubular tips or eyelets 14 vary in dimension according to the bore or passage therethrough dependent upon the size of glass stream to be flowed through the tubular tip. For example, an eyelet may have: an overall length of approximately one-hundred seventy-five thousandths of an inch, an outside diameter of the flange 17 of approximately one-hundred thirty-five thousandths of an inch, an outside diameter of the tubular body portion 21 of approximately one-hundred thousandths of an inch, and an interior bore or passage diameter of approximately seventy-five thousandths of an inch. The wall thickness of the tubular body portion or shank 21 is usually about twelve and one-half thousandths of an inch and the thickness of the flange 17 is normally about the same dimension. From these exemplary dimensions it will be seen that the tubular tips or eyelets 14 are of extremely small size and that a very short welding period is required to fuse the adjacent surfaces of the flange 17 and the plate 12 to form an effectively sealed joint without disturbing the dimensions of the eyelet passageways. The welding time may be varied and controlled by electrically controlled timing means of conventional character depending upon the particular platinum alloy utilized and the thickness and width of the flange 17.

Good results have been obtained in electron beam welding platinum alloy eyelets to a platinum alloy plate generally having dimensions like those disclosed herein under the following conditions: beam traversing speed — 100 inches per minute; electrical supply to the welder filament — 100 milliamps, 50 kilovolts.

Perhaps the greatest advantage of using the electron beam welder is the accurate control that is available. The deflection systems of available electron beam welders include the ability to generate circular or eliptical welds. This allows the entire periphery the thin flange to be welded to the plate. Experimental operation of several feeders using approximately 14,000 eyelet tips welded in this manner has shown that the welds do not leak.

The operation of the feeders using the electron beam welded eyelet tips of this invention have been shown to perform as well as those formed according to the Roberson U.S. Pat. No. 3,598,952. No excessive deformation of the feeder was observed even though the holes 13 in the plate 12 are necessarily larger than those produced by the Roberson method. Further the present invention is able to produce feeders at a faster and more economical rate. And using the present invention the size of the eyelet tips 14 may be decreased and the number of tips per unit of area may be increased over prior fabrication methods.

FIG. 7 illustrates another method and apparatus for positioning flanged eyelets to an apertured plate for electron beam welding according to the principles of the invention. As shown in FIG. 7 eyelets 114 are supplied from a hopper 55 and pressing device 57 to the bottom of a pre-drilled or punched plate 112. A fixture or support 50 has protruding alignment spikes 52 that correspond to orifices or opening 113 in the plate 112. The spikes 52 jut above the major surface 53 of the plate 112. Suitable commercial positioning apparatus and program controls may be used to align the preformed eyelet tips 114 over the spikes 52.

In prior art electric resistance welded systems, the spikes were made of non-electrical conductive, high heat-resistant ceramic material to prevent welding of the eyelet tip to the plate. Using electron beam welding, the spikes may be made of other suitable heat resistant materials since electric current is not passed through the eyelets. The fixture or support 50 may be mounted and water cooled by tubes in a manner similar to that described for the fixture 22 in FIG. 4. This method shown in FIG. 6 of electron beam welding of the tips 114 to the plate would allow the holes in punched plate to be smaller, thus increasing the overall strength of the plate.

It may be advantageous to form a stream flow section by successively forming apertures in a plate and locating a flanged eyelet at each of the apertures (for example, inserting eyelets in the apertures as shown in FIG. 3) before forming the next aperture in the plate.

Further, it may be advantageous to use flanged eyelets having their exit ends closed. The eyelets of the completed stream flow section would be subjected to a grinding operation that would form eyelets of equal projection of height and would open the closed eyelet ends. Also, it may be advantageous to produce a stream flow section using solid flanged eyelet blanks (no passageway) according to the principles of the invention.

It is apparent that, within the scope of the invention, modifications and different arrangements may be made other than as herein disclosed. The present disclosure is merely illustrative, the invention comprehending all variations thereof.

I claim:

1. In a method of forming a stream feeder wherein a tubular member having a flange and a shank is welded to a plate, the improvement comprising:
    directing an electron beam along the peripheral edge of the flange to simultaneously contact the flange and the plate and to weld the flange to the plate in the absence of fusing the shank to the plate.

2. The method of claim 1 wherein the beam is directed to avoid contacting the inner-half of the flange.

3. The method of claim 2 wherein the center-line of the beam intersects the peripheral edge of the flange.

4. In the method of claim 1, the improvement further comprising in the sequence set forth:
    a. gradually increasing power of the electron beam from a first level to a second, higher level as the beam is moved along the periphery;
    b. maintaining the beam at the higher power level as the beam is moved along the periphery of one complete circuit; and
    c. gradually decreasing the power of the beam from the higher level to a third level, as the beam is moved along the periphery.

5. The method of claim 4 wherein said periphery is circular, in step (a) the power of the beam is increased as the beam is moved along the first one-half of the periphery, and in step (c) the power of the beam is decreased as the beam is moved along the second one-half of the periphery.

6. The method of claim 5 wherein the beam is directed to avoid contacting the inner-half of the flange.

7. The method of claim 6 wherein the center-line of the beam intersects the peripheral edge of the flange.

8. The method of claim 7 wherein the first power level and the third power level are substantially equal.

9. The method of claim 8 wherein the beam is at the higher power level for only one complete circuit.

10. In a method of forming a feeder for producing glass fiber wherein a tubular member having a flange and a shank is welded to a plate, the improvement comprising:
    directing an electron beam at the outer peripheral edge of the flange to overlap the flange and the plate to weld the outer peripheral edge of the flange to the plate in the absence of fusing the shank to the plate to provide a visually inspectable weld.

11. The method of claim 10 wherein the beam is directed to contact the outer half of the flange.

12. The method of claim 11 wherein the beam is directed to weld the flange to the plate in the absence of fusing the shank to the plate.

* * * * *